(12) United States Patent
Taglialatela Scafati et al.

(10) Patent No.: US 8,984,933 B2
(45) Date of Patent: Mar. 24, 2015

(54) METHOD AND SYSTEM FOR CONTROL OF AN INTERNAL COMBUSTION ENGINE BASED ON ENGINE CRANK ANGLE

(71) Applicant: STMicroelectronics SRL, Agrate Brianza (MB) (IT)

(72) Inventors: Ferdinando Taglialatela Scafati, Naples (IT); Nicola Cesario, Arzano (IT); Domenico Porto, Catania (IT); Bianca Maria Vaglieco, Naples (IT); Simona Silvia Merola, Naples (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 138 days.

(21) Appl. No.: 13/804,133

(22) Filed: Mar. 14, 2013

(65) Prior Publication Data

US 2013/0211694 A1    Aug. 15, 2013

Related U.S. Application Data

(63) Continuation-in-part of application No. 12/648,120, filed on Dec. 28, 2009, now Pat. No. 8,429,955.

(30) Foreign Application Priority Data

Dec. 29, 2008    (IT) .............................. VA2008A0069

(51) Int. Cl.
| | |
|---|---|
| *G01M 15/12* | (2006.01) |
| *F02D 45/00* | (2006.01) |
| *G01L 23/22* | (2006.01) |
| *G01M 15/11* | (2006.01) |
| *F02D 41/00* | (2006.01) |

(Continued)

(52) U.S. Cl.
CPC .............. *F02D 45/00* (2013.01); *G01L 23/225* (2013.01); *G01M 15/11* (2013.01); *F02D 41/009* (2013.01); *F02D 35/028* (2013.01); *F02D 37/02* (2013.01); *F02D 41/0002* (2013.01); *F02D 2041/1432* (2013.01); *F02D 2200/025* (2013.01); *F02D 2200/1015* (2013.01); *F02P 5/1502* (2013.01); *F02P 11/06* (2013.01); *F02P 17/00* (2013.01); *Y02T 10/46* (2013.01); *F02P 5/153* (2013.01); *F02D 2200/1012* (2013.01)
USPC ...................................... 73/114.07; 73/35.09

(58) Field of Classification Search
CPC .............................. G01M 15/11; G01M 15/12
USPC ........ 73/35.01, 35.07, 35.09, 114.02, 114.05, 73/114.07, 114.24
See application file for complete search history.

(56) References Cited

U.S. PATENT DOCUMENTS 3,942,359 A * 3/1976 Arrigoni et al. ............. 73/35.09
4,002,155 A * 1/1977 Harned et al. ........... 123/406.39

(Continued)

FOREIGN PATENT DOCUMENTS

EP    1116945    7/2001

*Primary Examiner* — Eric S McCall
(74) *Attorney, Agent, or Firm* — Allen, Dyer, Doppelt, Milbrath & Gilchrist, P.A.

(57) ABSTRACT

A method for control of an internal combustion engine includes generating, with a microelectromechanical system (MEMS) accelerometer, an acceleration signal representing vibrations of the internal combustion engine. An engine crank angle signal is generated based on the acceleration signal. The engine crank angle signal is compared with a target value. The internal combustion engine is adjusted based upon the comparing.

24 Claims, 7 Drawing Sheets

(51) Int. Cl.
*F02D 35/02* (2006.01)
*F02P 5/15* (2006.01)
*F02D 37/02* (2006.01)
*F02D 41/14* (2006.01)
*F02P 11/06* (2006.01)
*F02P 17/00* (2006.01)
*F02P 5/153* (2006.01)

(56) References Cited

U.S. PATENT DOCUMENTS

| | | |
|---|---|---|
| 4,420,968 A | 12/1983 | Dudeck et al. |
| 4,584,869 A | 4/1986 | Frodsham |
| 4,672,843 A | 6/1987 | Pozniak |
| 4,761,993 A | 8/1988 | Klepacki |
| 5,119,783 A | 6/1992 | Komurasaki |
| 5,535,722 A | 7/1996 | Graessley et al. |
| 6,012,425 A | 1/2000 | Unland et al. |
| 6,273,064 B1 | 8/2001 | Scholl et al. |
| 6,388,444 B1 | 5/2002 | Hahn et al. |
| 6,397,669 B1 | 6/2002 | Raichle et al. |
| 6,460,408 B1 | 10/2002 | Gimmler et al. |
| 6,598,468 B2 | 7/2003 | Zur Loye et al. |
| 8,191,532 B2 | 6/2012 | Folkerts et al. |
| 2003/0010101 A1 | 1/2003 | Zur Loye et al. |
| 2004/0050363 A1 | 3/2004 | Yamaoka et al. |
| 2010/0106393 A1 | 4/2010 | Sgattie et al. |

* cited by examiner

METHOD AND SYSTEM FOR CONTROL OF AN INTERNAL COMBUSTION ENGINE BASED ON ENGINE CRANK ANGLE

RELATED APPLICATIONS

The present application is a continuation-in-part of U.S. patent application Ser. No. 12/648,120 filed on Dec. 28, 2009, the entire contents of which are incorporated by reference

FIELD OF THE INVENTION

The present invention relates in general to control of internal combustion engines, and, more particularly, to a method and system for detecting peak values of pressure in a cylinder of an internal combustion engine during combustion cycles, and for diagnosing misfire or partial combustion conditions in an internal combustion engine.

BACKGROUND OF THE INVENTION

To comply with ever restrictive emission regulations for limiting pollutants, real-time diagnostic techniques for combustion process monitoring in internal combustion (IC) engines are widely used. Information about the quality of combustion may provide important data for diagnosing operation of the engine, and may be advantageously used for advanced electronic engine controls. These controls are to ensure a good combustion quality in any condition of engine operating by real time removal of combustion anomalies, thus improving performances and reducing toxic exhaust gas emissions. Two important combustion anomalies in IC engines are misfire and partial burning. Misfire and partial burning are terms used to indicate an absent and a weak combustion in a combustion cycle. In IC engines these phenomena generally occur when the incoming air/fuel mixture is excessively diluted (with air or with exhaust gas recycled) or when faults occur in the ignition system.

When, in a cylinder of an IC engine, combustion does not occur or occurs only incompletely, unburned fuel enters the exhaust system and eventually burns in the hot catalytic converter.

The released heat may damage or destroy the catalytic converter by thermal overloading. Moreover, misfire and partial burning events lead to instability of the engine and to a rapid increase of hydrocarbon emissions. Current emission regulations force engine manufacturers to equip cars with systems able to detect engine misfires and to alert the driver when the misfire rate has the potential to affect the engine emission or after-treatment system. For all these reasons, detection of misfire is a critical issue for electronic engine control systems, and several methods have been proposed and used to address this concern.

A method largely used to evaluate misfires for on-board diagnosis purposes is based on the analysis of the rotational velocity of the engine based on a signal coming from a crankshaft inductive speed sensor. A misfire event is correlated to characteristic variations in the crankshaft speed: these speed fluctuations are used as misfire indicators for misfire diagnosis. However, the crankshaft speed fluctuation method has difficulties in detecting misfires in some particular conditions.

For example, rough roads can make the engine velocity profile appear as if misfire events were occurring. Moreover, the rotational speed, measured on the crankshaft, is influenced by combustion in all cylinders, thus performances of these misfire detection methods are relatively poor when the total mass of inertia, engine speed, or the number of cylinders increase, because the relative acceleration difference between normal combustion and misfire becomes almost imperceptible under these circumstances.

All of these considerations lead to sophisticated hardware and software for analysis and filtering speed data. Alternative methods based on ionization analysis are considered an efficient approach to misfire detection. Their main advantage is exploitation of a component already present inside the combustion chamber, namely the spark plug, for ion-current sensing.

However, the most sensitive and reliable method for misfire and partial burning detection involves direct pressure measurement inside each cylinder of the engine. This is because the parameter widely considered as the most important parameter for the evaluation of combustion quality is the pressure in the cylinder.

It has been observed that, in case of misfire events, the in-cylinder pressure cycle presents a typical waveform as depicted in FIG. 1. When a misfire event occurs, the in-cylinder pressure peak is located at 0 crank angles (C.A.), that is, at the Top Dead Center position of the piston, for every engine operating condition. This means that the location of the pressure peak (LPP) is always equal to 0 C.A.

In case of partial burning, due for example, to a highly diluted air-fuel mixture, the duration of the combustion process increases and there is no time to complete the combustion before the exhaust gas valve opens. As a consequence, the combustion pressure cycle has a typical shape as depicted in FIG. 2. The pressure peak is significantly shifted to the right of the top Dead Center position (0 C.A.), which is much more than in the case of a "normal combustion".

The above described characteristics of the in-cylinder pressure cycle, during combustion anomalies, demonstrate that the LPP is an important parameter for real time diagnosing the occurrence of misfires or of partial burning events. In particular:

LPP is equal to a zero crank angle in case of misfire events;
LPP falls in a certain angular range of the crank position in case of normal combustion; and
LPP is greater than a certain angular value in case of partial burning.

A drawback of this technique is that it is difficult and relatively expensive to install pressure sensors in the combustion chamber. Moreover, the pressure sensor installed in the cylinder needs to be capable of withstanding high temperatures and pressures without being damaged. For all these reasons, diagnostic techniques based on cylinder pressure analysis are currently limited to research applications.

Compared to the use of combustion pressure sensors, non-intrusive diagnostic techniques offer several advantages because the sensors are generally placed out of the combustion chamber, and thus no structural modifications of the engine are required. Moreover, these sensors do not need to withstand very high pressures and temperatures, therefore, they may be of relatively low cost. Several non-intrusive diagnostic techniques have been proposed to measure the quality of combustion in internal combustion engines. Among these techniques, those based on the analysis of accelerometer data have earned a greater success.

The U.S. Pat. No. 6,388,444 discloses a method for detecting misfires, comprising the steps of measuring engine vibration energy caused by combustion by analyzing accelerometer data, measuring instantaneous crankshaft and camshaft positions for determining in which of the combustion chambers of a multiple cylinder engine combustion is expected to occur, and determining whether or not a normal combustion has occurred using both accelerometer data and crankshaft acceleration data.

Important features of this prior method are the deployment of an accelerometer for sensing vibrations of the engine, a variable reluctance sensor for sensing acceleration of the crankshaft, and the combined processing of the signals generated by the above devices for detecting misfires.

U.S. Pat. No. 6,273,064 discloses a method wherein the engine vibration data sensed by an accelerometer is sampled during a defined observation window in the combustion cycle during which combustion occurs. The window is calculated using camshaft and crankshaft position sensor data. The accelerometer data are processed to estimate cylinder combustion energy. This computed value is compared to normal combustion energy values with stable combustion. If the computed value deviates more than a desired amount, spark timing, air/fuel ratio or exhaust gas recirculation are adjusted.

The data processing according to these methods is relatively burdensome and expensive. A need remains for a simple and low-cost technique for sensing a misfire or a partial combustion condition in an engine or, basically, for identifying the angular location of the in-cylinder pressure peak (LPP).

SUMMARY OF THE INVENTION

An object of the present invention is to provide a straightforward and effective method and related system for controlling an internal combustion engine.

This and other objects, advantages and features in accordance with the present invention are provided by a method for control of an internal combustion engine comprising generating, with a microelectro-mechanical system (MEMS) accelerometer, an acceleration signal representing vibrations of the internal combustion engine, filtering the acceleration signal, determining a maximum value of the filtered acceleration signal, determining a maximum value of the filtered acceleration signal, determining timing of the maximum value of the filtered acceleration signal, generating an engine crank angle signal corresponding to the timing of the maximum value of the filtered acceleration signal, comparing the engine crank angle signal with a target value, and adjusting the internal combustion engine based upon the comparing.

The adjusting may comprise adjusting ignition timing of the internal combustion engine. The ignition timing may be adjusted to match the engine crank angle signal with the target value. The method may further comprise determining the target value based on at least one of a speed value of the internal combustion engine and an engine torque value.

The engine crank signal corresponds to an in-cylinder peak pressure. The acceleration signal may be filtered with a bandpass filter.

Another aspect is directed to a corresponding system for control of an internal combustion engine. The system may comprise a microelectromechanical system (MEMS) accelerometer to generate an acceleration signal representing vibrations of the internal combustion engine, a filter for filtering the acceleration signal, and circuitry configured to determine a maximum value of the filtered acceleration signal, determine timing of the maximum value of the filtered acceleration signal, generate an engine crank angle signal corresponding to the timing of the maximum value of the filtered acceleration signal, compare the engine crank angle signal with a target value, and adjust the internal combustion engine based upon the comparing.

DESCRIPTION OF THE PREFERRED EMBODIMENTS

The device includes at least an accelerometer, preferably, though not necessarily, a microelectro-mechanical system (MEMS) accelerometer installed on the engine body for sensing vibrations and obtaining real time information about in-cylinder pressure of the engine that is used for diagnosing eventual misfire or partial combustion events. The generated diagnostic information may be used for real time controlling the functioning of the engine by preventing or correcting combustion anomalies (such as misfire, partial burning, etc.).

Tests carried out showed that, in operating conditions of internal combustion engines, there is a high correlation between the vibrational waveform, generated by an accelerometer mounted on the engine body for sensing vibrations of the engine, and the cylinder internal pressure signal.

Figure 1:
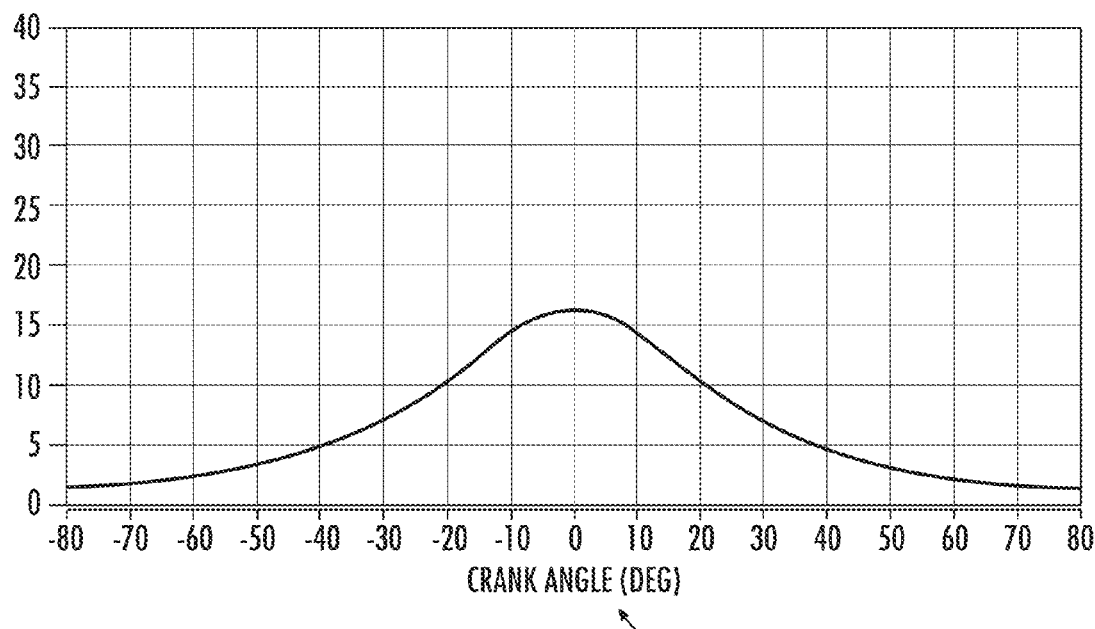
FIG. 1 is an exemplary graph representation of the pressure in a combustion chamber for various crank angles in case of a misfire condition.
Figure 2:
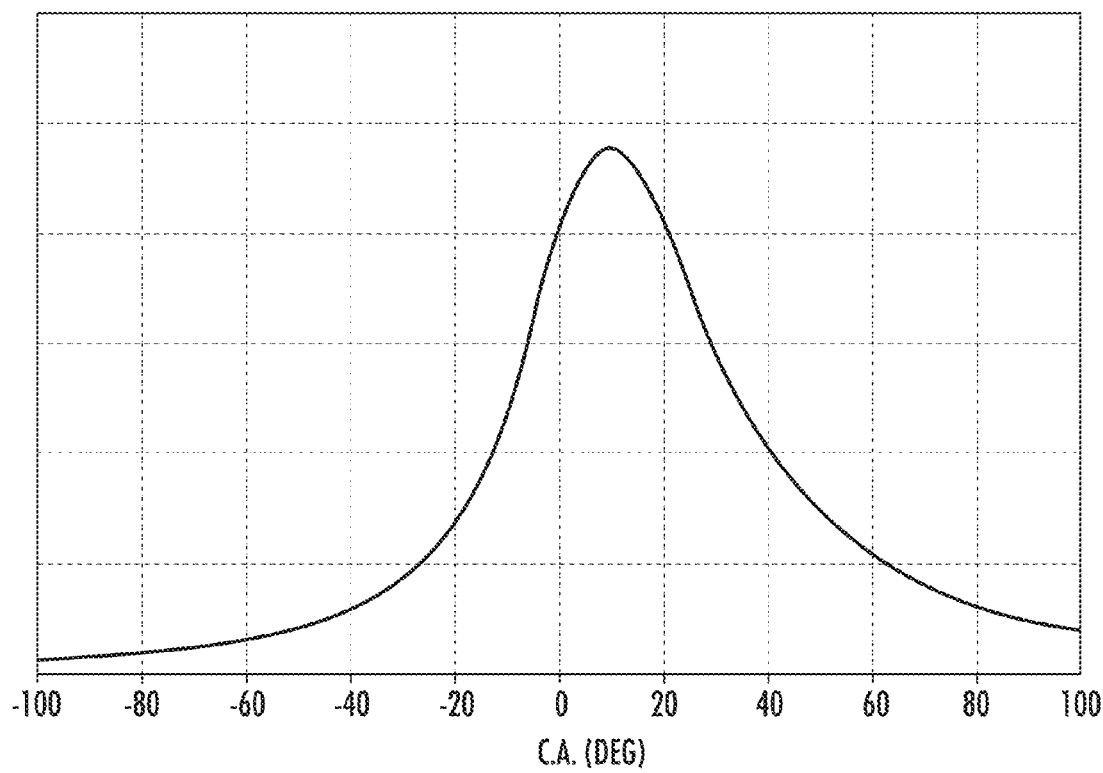
FIG. 2 is an exemplary graph representation of the pressure in a combustion chamber for various crank angles in case of a partial combustion condition.
Figure 3:
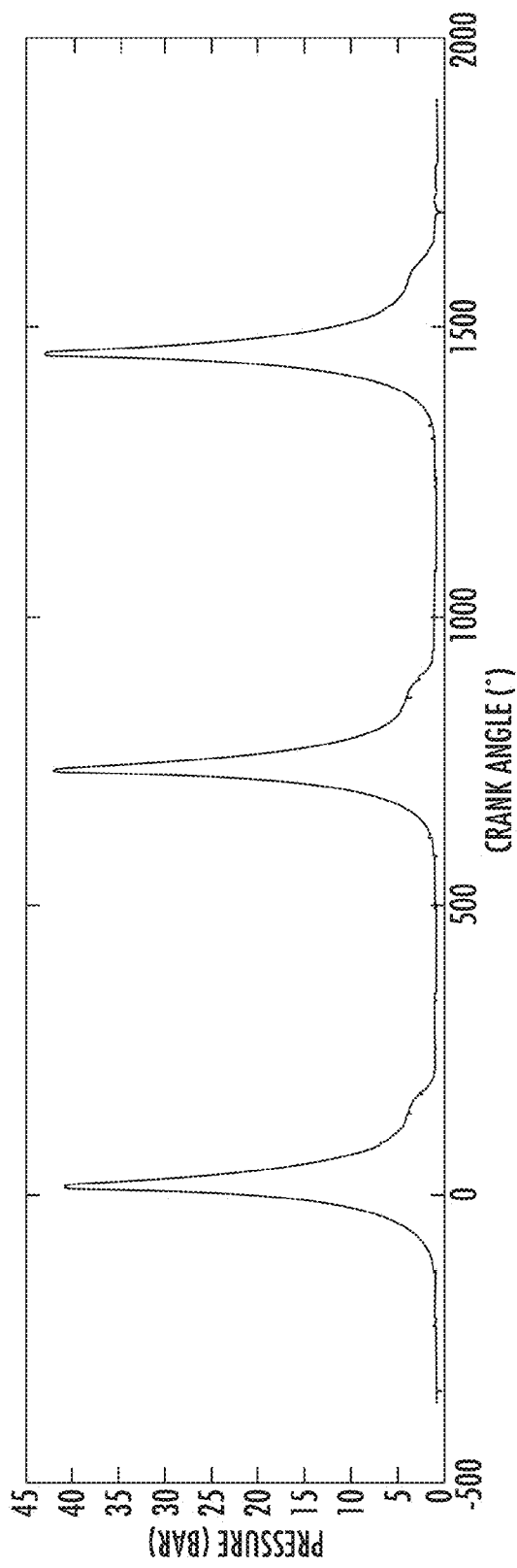
FIG. 3 compares graphical representations of pressure in a combustion chamber and acceleration of engine due to vibration for various crank angles.
Figure 3:
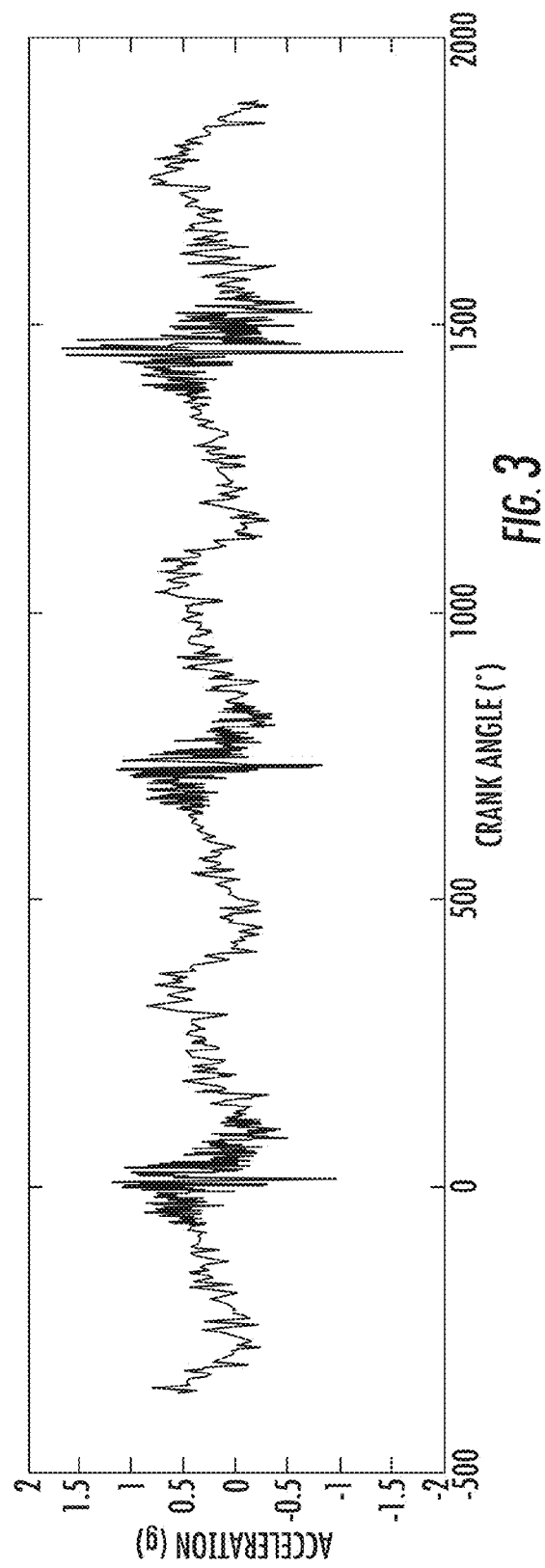

For preliminary test purposes, an accelerometer has been mounted on the body of a single cylinder test engine also having an in-cylinder pressure sensor. The signals generated by the pressure sensor and by the accelerometer were compared for various crank angles, as shown in FIG. 3. The graphs clearly confirm the existence of a significant correlation between the two signals. This correlation is even more evident by comparing the frequency spectrum of the acceleration signal of FIG. 4, with that of the pressure signal, as shown in FIG. 5.

In particular, when the pressure in the combustion chamber attains a peak value, the acceleration signal has a dominant frequency component. At the dominant frequency component of the acceleration signal, a maximum value of the acceleration signal is attained. This fact makes possible detection of combustion pressure peaks in a cylinder with a non-intrusive technique by suitably processing accelerometer data. This in turn makes available important information about the combustion quality in spark ignition engines using even a single accelerometer mounted on the engine body.

Figure 4:
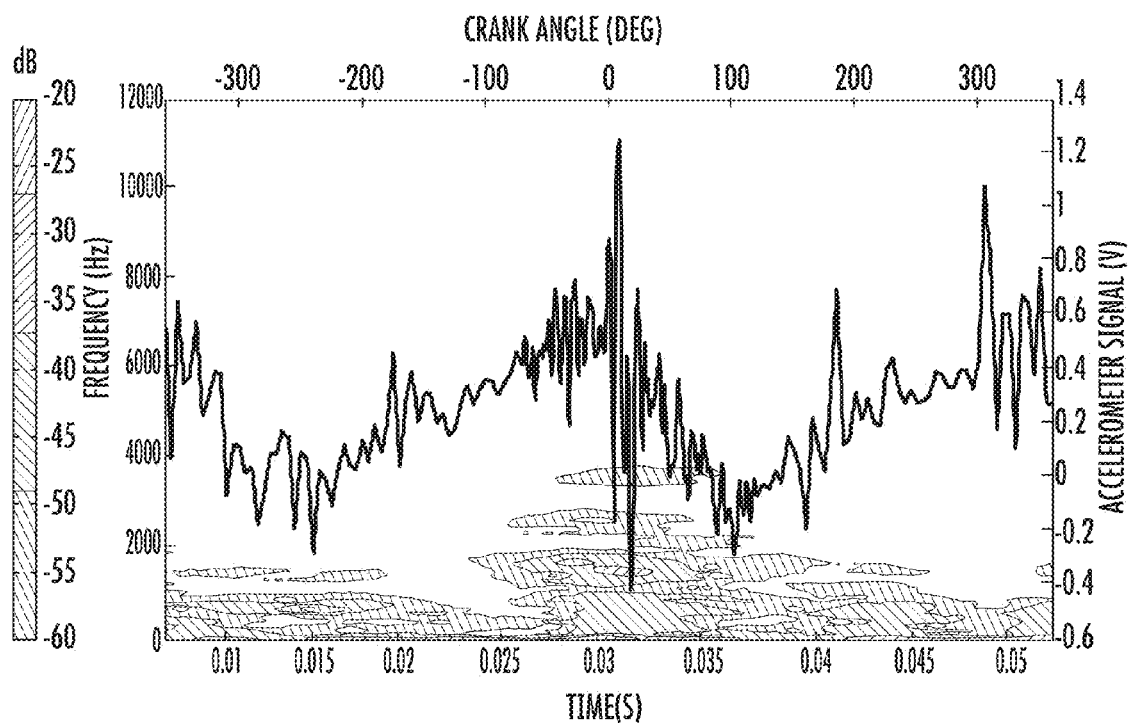
FIG. 4 is a time graph representation of the acceleration signal of FIG. 3 and of its frequency spectrum.
Figure 5:
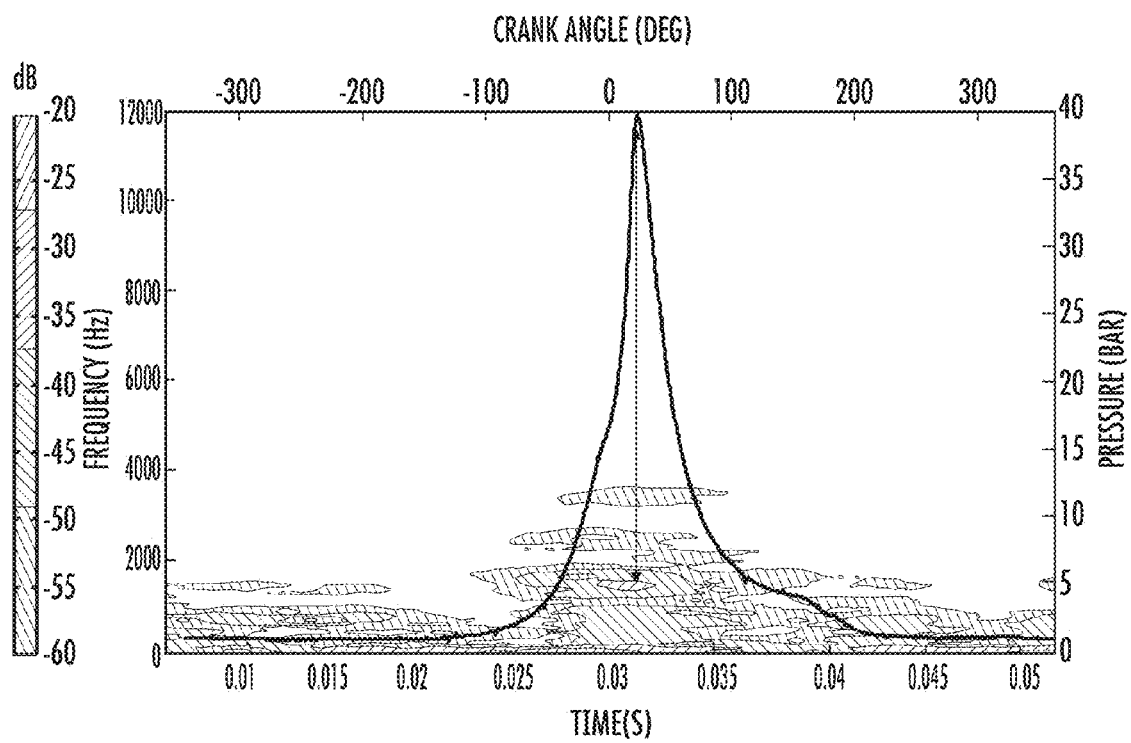
FIG. 5 is a time graph representation of the pressure signal of FIG. 3 and of the frequency spectrum of the acceleration signal.
Figure 6:
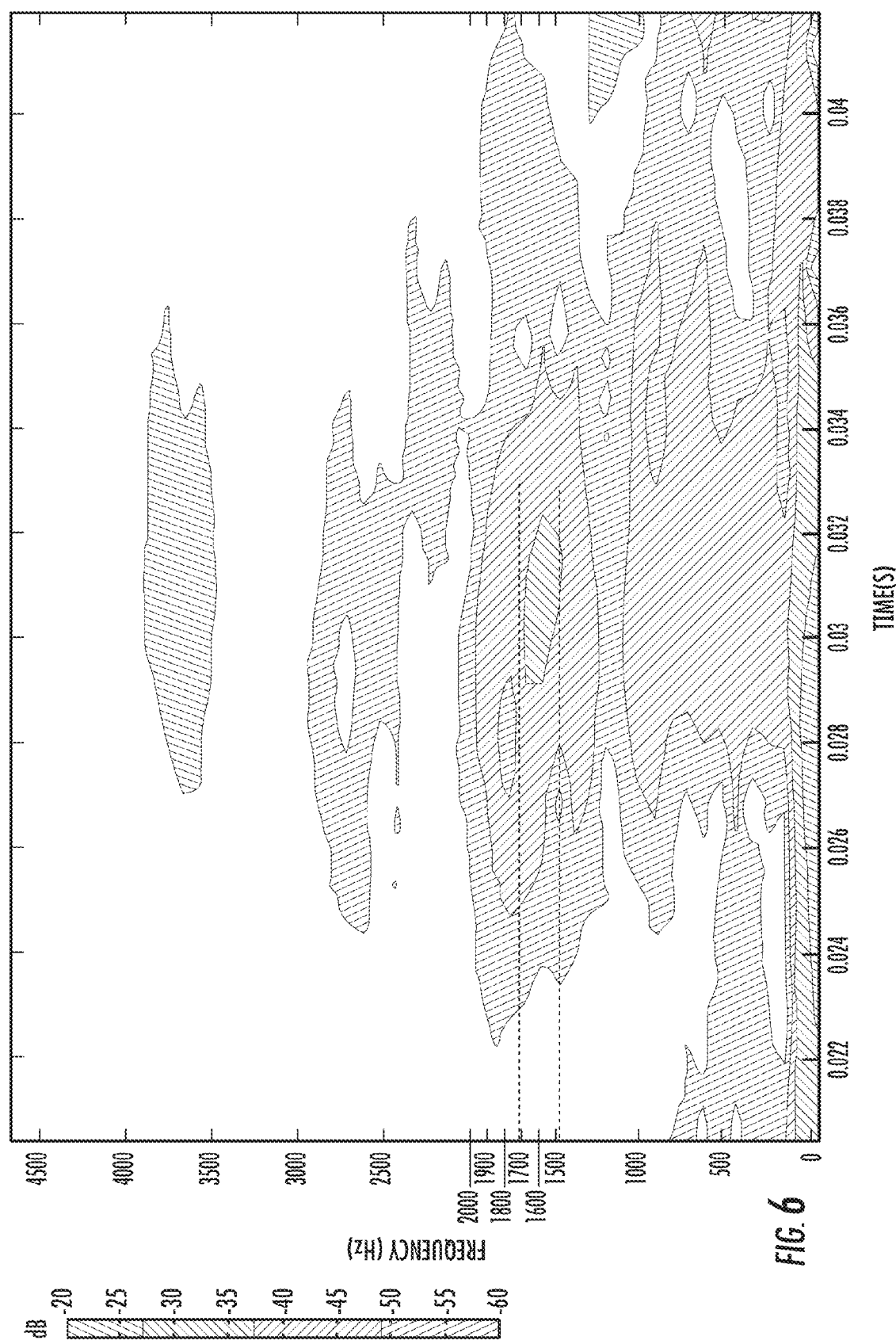
FIG. 6 is a time graph representation of the frequency spectrum of the acceleration signal in a time window that includes the instant at which the crank is in its Top Dead Center position.
Figure 7:
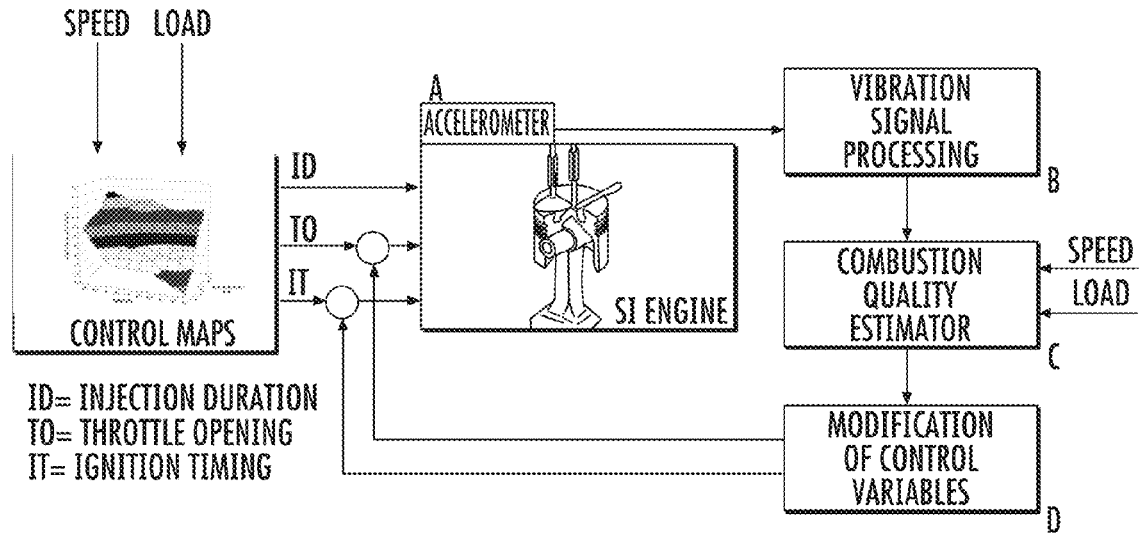
FIG. 7 is a functional block diagram of a system for diagnosing and controlling the functioning of an engine, in accordance with the present invention.

FIG. 6 is a detailed view of the frequency spectrum of the acceleration signal of FIG. 4 in a time window that includes the instant in which the crank attains its Top Dead Center position, at about 0.03 seconds. From this figure it may be observed that the energy content of the spectrum for frequencies above 1 kHz and below 2 kHz is not negligible in the vicinity of the instant at which the pressure peak occurs. In particular, the frequency components of the acceleration signal in the range from about 1500 Hz to about 1700 Hz shows a relatively large amplitude in correspondence of the in-cylinder pressure peak.

According to the method, a pressure peak in a cylinder is detected by installing an accelerometer on the engine body, band-pass filtering the acceleration signal generated by the accelerometer, comparing the filtered signal with a threshold, and generating a logically active flag when the threshold is surpassed. The cut-off frequencies of the band-pass filter depend on the structural characteristics of the engine used, and they may be different for different types of engines. Calculated timing of the filtered vibration signal peak value may be expressed in terms of engine crank angles. The crank angle position then corresponds to the timing (in terms of crank angle position) of an in-cylinder pressure peak value.

In multi-cylinder engines, a plurality of accelerometers may be installed on the engine body, each accelerometer for a respective cylinder of the engine. The acceleration signal generated by each accelerometer mounted on the engine body is influenced not only by vibrations caused by combustion in the respective cylinder, but also by vibrations due to combustions and motion of pistons into the other cylinders.

To accurately detect a pressure peak in a cylinder, part of the acceleration signal representing the vibration corresponding to the combustion process in the cylinder of interest may be considered. For this reason it is useful to mask the acceleration signal or the band-pass replica thereof in a complete or whole combustion cycle except within time windows that include the instant at which the piston of the cylinder of interest attains its Top Dead Center position, which is assumed to be the reference position (Crank Angle=0°. With this, the portion of the acceleration signal that is more influenced by the combustion in the monitored cylinder is considered.

The system for diagnosing misfire or partial combustion conditions and for controlling an engine substantially may comprise at least an accelerometer (Block A) mounted on the body of a spark ignition engine SI ENGINE for sensing vibrations of the engine. A circuit (Block B) processes the acceleration signal generated by the accelerometer.

Engine body vibrations are due to several sources, such as valve openings and closings, piston slaps, combustion process and additive noise. Transient waveforms generated by these sources overlap each other and the contribution of interest may helpfully be singled out. To extract information about the combustion process from the accelerometer signal, the vibration signal is first filtered in an Electronic Control Unit (ECU) by a pass-band filter. The cut-off frequencies of the band-pass filter depend in general on structural and combustion characteristics of the particular engine being used, and thus they may be different for different engines. For this reason, the cut-off frequencies of the band-pass filter should be experimentally determined in a setup phase, after having mounted the accelerometer on the engine body.

It has been found that, for the tested engines, the accelerometer signal contains dominant frequencies in the range from about 1 kHz and about 2 kHz, when combustion peaks occur.

According to an embodiment, the cut-off frequencies of the band-pass filter are about 1500 Hz and about 1700 Hz.

In case of multi-cylinder engines, the vibration signal coming from an accelerometer is influenced not only by vibrations in the cylinder of interest, but also by vibrations coming from piston movement in the other cylinders. To enhance reliability in detecting pressure peaks in a certain cylinder, part of the vibration signal should be processed. For this reason, the vibration signal coming from the band-pass filter is properly windowed and part of this signal (which occurs in a defined angular window of the crank angle) is considered. Finally, the angular location of maximum amplitude (LMA) of the filtered and windowed accelerometer signal is obtained. The LMA value is output by the Block B and is sent to the Block C.

The circuit Block C diagnoses the occurrence of a misfire or a partial burning condition as a function of the estimated LMA value coming from Block B, of the speed of the engine SPEED and of the supplied torque LOAD. Preferably, to have a more robust control and avoid engine instabilities, the evaluation of combustion quality and the subsequent control action are performed after several consecutive engine cycles (for example, every 10 or more cycles).

The Block C may use an analog buffer capable of performing the LMA values acquisition for 10 consecutive engine cycles (or any other set number). Estimation of combustion quality is preferably obtained by a fuzzy system which uses the information from the analog buffer. The fuzzy system is designed to be a "classifier" of the combustion phenomena. The output of this fuzzy system is a combustion index, that is, an index describing the membership to a class of combustion anomalies (e.g., 0-class for misfire, 1-class for partial burning, and so on . . . ).

Finally, depending on the combustion index, a controller (Block D) modifies in real time the reference throttle opening time TO and the reference ignition time IT, in order to eliminate eventually diagnosed combustion anomalies.

Figure 8:
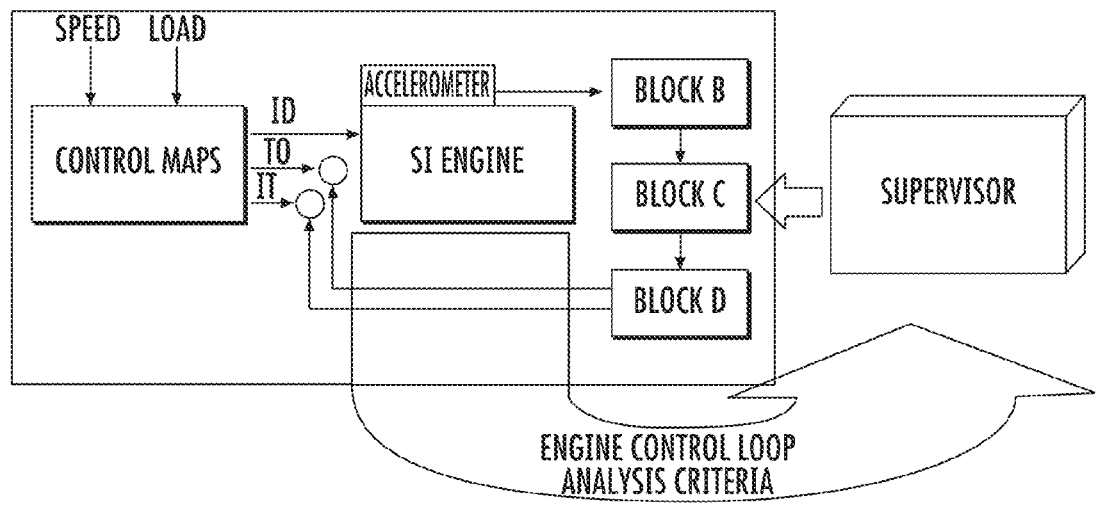
FIG. 8 is a functional block diagram of the system of FIG. 7 provided with a supervising unit SUPERVISOR for training off-line the fuzzy system BLOCK C.

The fuzzy system (i.e. rules, membership function shape, inference model, etc. . . . ) may be preliminarily trained in a supervised mode according to the scheme of FIG. 8, with an optimization algorithm.

The block SUPERVISOR analyzes some data inherent to the engine control loop (e.g., number of partial burnings and misfires in the engine speed range, time in which the air/fuel ratio is at its stoichiometric value, etc.) and, as a function of these parameters, modifies the parameters of the fuzzy system (i.e., Block C) to obtain the optimal tradeoff between the contrasting objectives of minimization of the time in which the air/fuel ratio differs from the stoichiometric value, and minimization of misfire and partial burning conditions.

As discussed above, the filtered vibration signal is compared with a threshold and a logically active flag is generated when the threshold is surpassed. Another aspect, as will now be discussed, is directed to taking the filtered vibration signal, and calculating the timing (expressed as engine angular position) of a maximum value of the filtered vibration signal. Tests carried out showed that the engine crank angle at which the filtered vibration signal attains its maximum value (LMA) corresponds to the engine crank angle at which the in-cylinder pressure peak (LPP) occurs.

The calculation of the LMA value thus allows one to know the value of LPP. In this approach, an engine crank angle signal is generated based on the acceleration signal, the engine crank angle signal is then compared with a target value, and the internal combustion engine is adjusted based upon the comparing.

Figure 9:
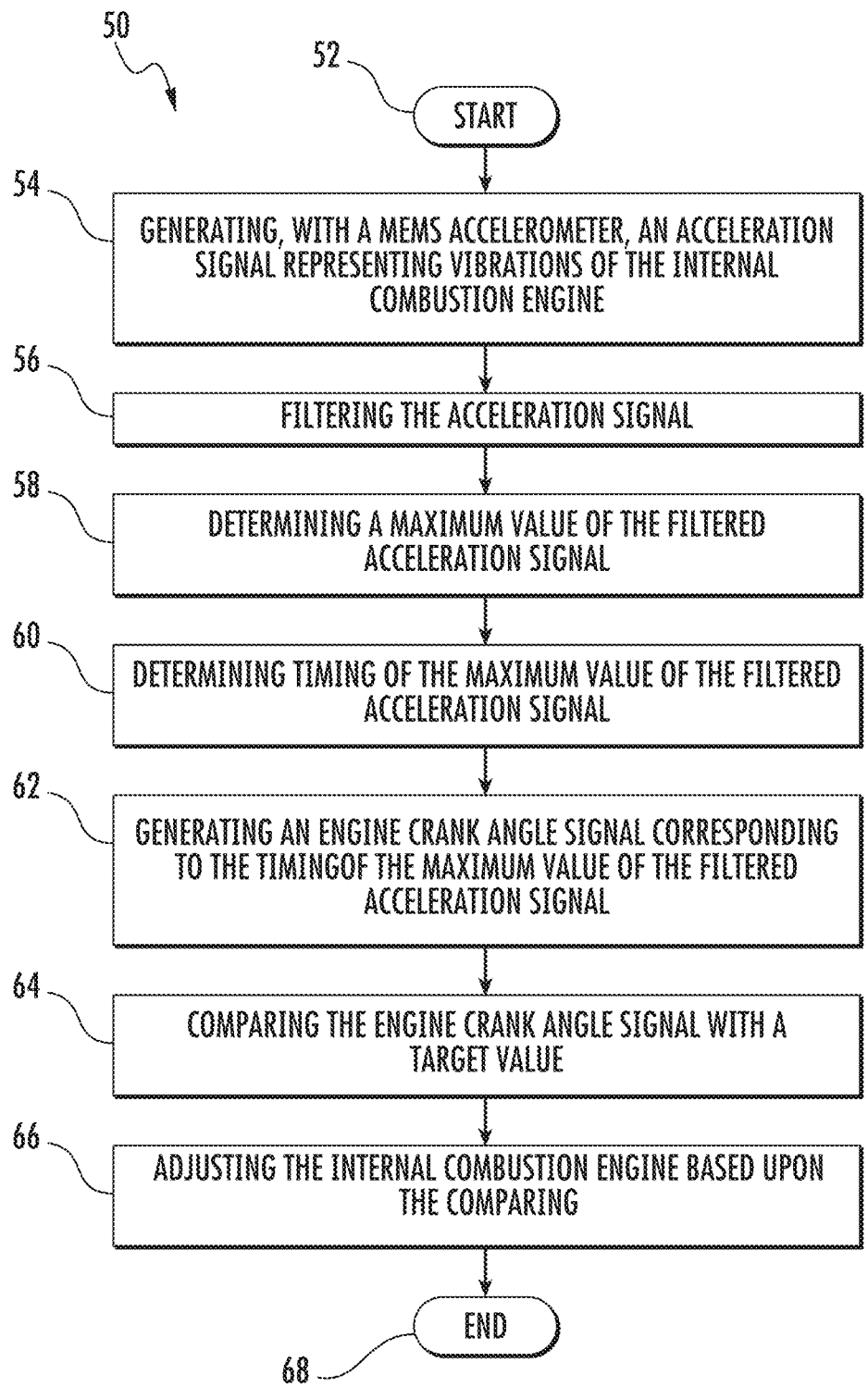
FIG. 9 is a flowchart illustrating a method for control of an internal combustion engine, in accordance with the present invention.

Referring now to the flowchart 50 in FIG. 9, a method for control of an internal combustion engine based on an engine crank angle includes from the start, (Block 52) generating with a microelectromechanical system (MEMS) accelerometer at Block 54, an acceleration signal representing vibrations of the internal combustion engine. The acceleration signal is filtered at Block 56, such as by using a band-pass filter. A maximum value of the filtered acceleration signal is determined at Block 58. Timing of the maximum value of the filtered acceleration signal is determined at Block 60. An engine crank angle signal corresponding to the timing of the maximum value of the filtered acceleration signal is generated at Block 62. The engine crank angle signal is compared at Block 64 with a target value. The internal combustion engine is adjusted at Block 66 based upon the comparing. The method ends at Block 68.

To perform the adjusting, the ignition timing of the internal combustion engine is adjusted. The ignition timing may be adjusted until the engine crank angle signal matches with the target value. The target value is determined based on at least one of a speed value of the internal combustion engine and an engine torque value. The target value may be pre-computed and stored in the engine control maps for different speed values of the internal combustion engine and for different engine torque values, with the target value used in the comparing corresponding to at least one of the speed value of the internal combustion engine and the engine torque value. As discussed above, the engine crank signal (LMA) corresponds to an in-cylinder peak pressure (LPP).

Figure 10:
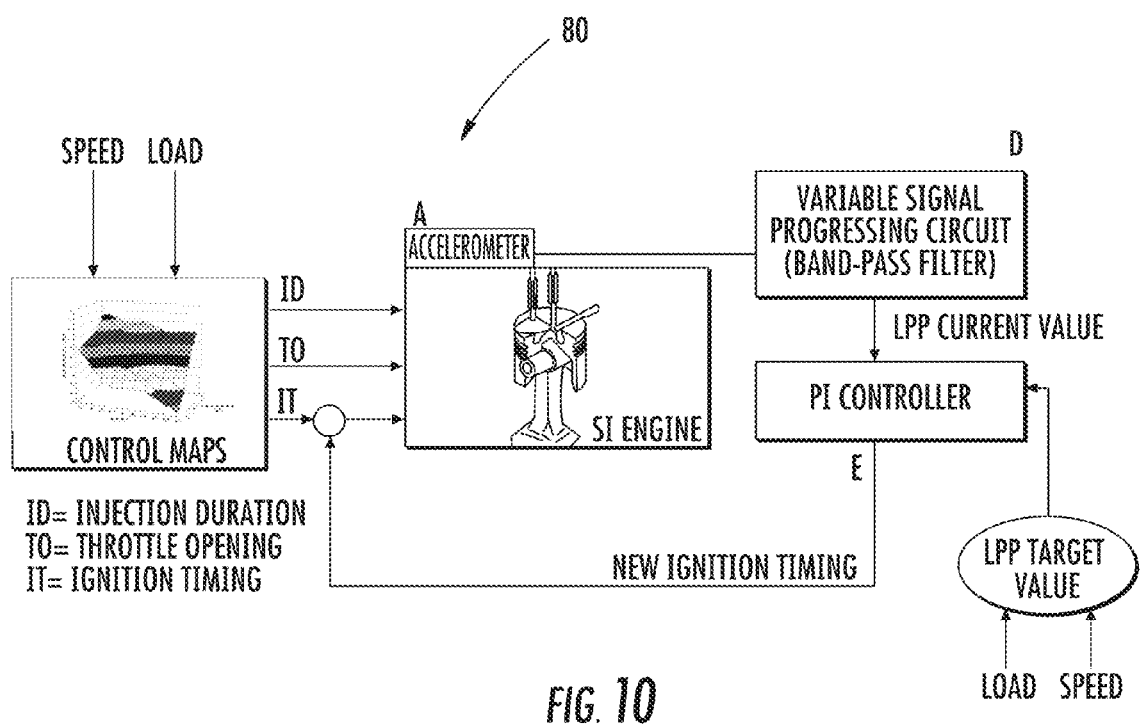
FIG. 10 is a functional block diagram of an embodiment of a system for diagnosing and controlling the functioning of an engine, in accordance with the flowchart of FIG. 9.

A system 80 for diagnosing and controlling the functioning of an engine based on an engine crank angle is now described with additional reference to FIG. 10. A microelectromechanical system (MEMS) accelerometer (Block A) generates an acceleration signal representing vibrations of the internal combustion engine.

Circuitry corresponding to Blocks D and E is configured to implement Blocks 56-66 in the flowchart 50 in FIG. 9. Block D is a variable signal processing circuit that also includes the band-pass filter. Block E is the controller. Collectively, the variable signal processing circuit and the controller determine a maximum value of the filtered acceleration signal, determine timing of the maximum value of the filtered acceleration signal, generate an engine crank angle signal corresponding to the timing of the maximum value of the filtered acceleration signal, compare the engine crank angle signal with a target value, and adjust the internal combustion engine based upon the comparing.

More particularly, variable signal processing circuit (Block D) processes the vibration signal from the accelerometer (Block A) and gives, as output, the LPP value. The variable signal processing circuit (Block D) also performs a band-pass filtering of the vibration signal and calculates the timing of the maximum value of the vibration signal (LMA). This latter value is equal to the in-cylinder pressure peak (LPP).

An LPP estimated value is then sent to the controller (Block C), which compares the LPP estimated value with a LPP target value. The target value may be defined off-line based on at least one of engine speed and load values stored in the engine control maps. The controller (Block C), through a PI control law, modifies ignition timing until the LPP estimated value reaches or matches its target value.

The controller (Block C) may be implemented as a controller for obtaining an optimal combustion of gasoline engines. For optimal combustion, the position of the pressure peak (LPP) should be as close as possible to a reference or target value, defined on the basis of engine speed and load. The control algorithm operating within the controller (Block C) thus maintains the peak pressure (LPP) location as close as possible to this reference or target value by adjusting the engine ignition timing.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for control of an internal combustion engine comprising:
   generating, with a microelectromechanical system (MEMS) accelerometer, an acceleration signal representing vibrations of the internal combustion engine;
   generating, with circuitry, an engine crank angle signal based on the acceleration signal;
   comparing, with the circuitry, the engine crank angle signal with a target value; and
   adjusting, with circuitry, the internal combustion engine based upon the comparing.

2. The method according to claim 1, wherein the adjusting comprises adjusting ignition timing of the internal combustion engine.

3. The method according to claim 2, wherein the ignition timing is adjusted to match the engine crank angle signal with the target value.

4. The method according to claim 1, further comprising determining the target value based on at least one of a speed value of the internal combustion engine and an engine torque value.

5. The method according to claim 1, wherein the engine crank signal corresponds to an in-cylinder peak pressure.

6. The method according to claim 1, wherein generating the engine crank angle signal comprises:
   filtering the acceleration signal;
   determining a maximum value of the filtered acceleration signal; and
   determining timing of the maximum value of the filtered acceleration signal, with the timing corresponding to the engine crank angle signal.

7. The method according to claim 6, wherein the acceleration signal is filtered with a band-pass filter.

8. A method for control of an internal combustion engine comprising:
   generating, with a microelectromechanical system (MEMS) accelerometer, an acceleration signal representing vibrations of the internal combustion engine;
   filtering the acceleration signal;
   determining, with circuitry, a maximum value of the filtered acceleration signal;
   determining, with the circuitry, timing of the maximum value of the filtered acceleration signal;
   generating, with the circuitry, an engine crank angle signal corresponding to the timing of the maximum value of the filtered acceleration signal;
   comparing, with the circuitry, the engine crank angle signal with a target value; and adjusting, with the circuitry, the internal combustion engine based upon the comparing.

9. The method according to claim 8, wherein the adjusting comprises adjusting ignition timing of the internal combustion engine.

10. The method according to claim 9, wherein the ignition timing is adjusted to match the engine crank angle signal with the target value.

11. The method according to claim 8, further comprising determining the target value based on at least one of a speed value of the internal combustion engine and an engine torque value.

12. The method according to claim 8, wherein the engine crank signal corresponds to an in-cylinder peak pressure.

13. The method according to claim 8, wherein the acceleration signal is filtered with a band-pass filter.

14. A system for control of an internal combustion engine comprising:
 a microelectromechanical system (MEMS) accelerometer to generate an acceleration signal representing vibrations of the internal combustion engine; and
 circuitry configured to
 generate an engine crank angle signal based on the acceleration signal,
 compare the engine crank angle signal with a target value, and
 adjust the internal combustion engine based upon the comparing.

15. The system according to claim 14, wherein said circuitry is further configured to adjust ignition timing of the internal combustion engine.

16. The system according to claim 15, wherein the ignition timing is adjusted to match the engine crank angle signal with the target value.

17. The system according to claim 14, wherein said circuitry is further configured to determine the target value based on at least one of a speed value of the internal combustion engine and an engine torque value.

18. The system according to claim 14, wherein the engine crank signal corresponds to an in-cylinder peak pressure.

19. A system for control of an internal combustion engine comprising:
 a microelectromechanical system (MEMS) accelerometer to generate an acceleration signal representing vibrations of the internal combustion engine;
 a filter for filtering the acceleration signal; and
 circuitry configured to determine a maximum value of the filtered acceleration signal,
 determine timing of the maximum value of the filtered acceleration signal,
 generate an engine crank angle signal corresponding to the timing of the maximum value of the filtered acceleration signal,
 compare the engine crank angle signal with a target value, and
 adjust the internal combustion engine based upon the comparing.

20. The system according to claim 19, wherein said circuitry is further configured to adjust ignition timing of the internal combustion engine.

21. The system according to claim 20, wherein the ignition timing is adjusted to match the engine crank angle signal with the target value.

22. The system according to claim 19, further said circuitry is further configured to determine the target value based on at least one of a speed value of the internal combustion engine and an engine torque value.

23. The system according to claim 19, wherein the engine crank signal corresponds to an in-cylinder peak pressure.

24. The system according to claim 19, wherein said filter comprises a band-pass filter.

* * * * *